(12) United States Patent
O'Connor

(10) Patent No.: US 6,262,658 B1
(45) Date of Patent: Jul. 17, 2001

(54) TIPPING INDICATOR

(75) Inventor: Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,114

(22) Filed: Dec. 17, 1999

(51) Int. Cl.$^7$ ........................................................ B60Q 1/00
(52) U.S. Cl. ........................ 340/440; 340/429; 340/438; 340/440; 340/689
(58) Field of Search ...................... 340/429, 438, 340/440, 461, 462, 689; 280/707, 710; 180/282, 283, 290

(56) References Cited

U.S. PATENT DOCUMENTS

| | | | |
|---|---|---|---|
| 3,971,451 | * 7/1976 | Norberg | 177/1 |
| 5,130,693 | * 7/1992 | Gigandet | 340/326 |
| 5,243,525 | * 9/1993 | Tsutsumi et al. | 701/37 |
| 5,765,290 | 6/1998 | Rank et al. | 33/365 |
| 5,825,284 | * 10/1998 | Dunwoody et al. | 340/440 |

* cited by examiner

Primary Examiner—Van T. Trieu
(74) Attorney, Agent, or Firm—Trop, Pruner & Hu, PC

(57) ABSTRACT

A processor-based system may be utilized to analyze signals from at least two supports supporting a device, such as a motor vehicle, to provide an indication when a weight change is such that tipping or rollover of the device or vehicle is of concern. In this way, an early warning may be provided when a condition arises which may cause a dangerous event to occur. The processor-based system may provide a variety of indications of tipping levels, a variety of different types of warnings and information about how to overcome the potential tipping.

18 Claims, 3 Drawing Sheets

TIPPING INDICATOR

BACKGROUND

This invention relates generally to devices which indicate incipient tipping or rollover of a machine such as a vehicle.

Tipping occurs when the center of gravity of a freestanding object shifts so that it is no longer within the perimeter defined by the elements that support the object. In a number of cases, there is a need to know when a machine is about to tip over. For example, when a motor vehicle is about to tip over, the operator may be warned to avoid rollover and potential injury. The possibility of rollover is a real problem for a number of commercial vehicles such as large tractor trailer trucks. Tipping or rollover may also occur with a variety of recreational vehicles such as sport utility vehicles, motorcycles and off-road vehicles such as dune buggies.

Tipping may be a problem not only in connection with motor vehicles but also in connection with large commercial cranes, such as construction cranes and cranes that are utilized to unload ships. Because of the large cantilevered forces applied by the crane, a tipping condition may occur unexpectedly.

Tipping may be result of centrifugal forces applied to a machine such as a vehicle during a turn. Tipping also may be the result of disturbances, such as high winds or impacts. A variety of circumstances may arise which may, to varying degrees of predictability, cause a given device having a given characteristic to turn over.

Thus, there is a need to detect when a device may tip over so as to enable intervention and tipping prevention.

SUMMARY

In accordance with one aspect, a method of detecting tipping of a device includes obtaining an indication of the force applied to at least two supports for the device. A change in an indication of the force applied to one of the supports is detected. A determination is made as to whether the change exceeds a threshold and a tilt indication is provided.

Other aspects are set forth in the accompanying detailed description and claims.

DETAILED DESCRIPTION

Figure 1:
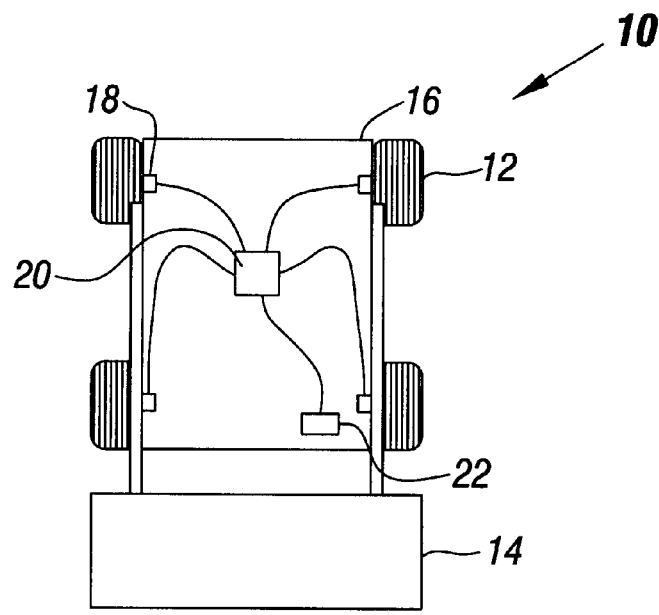
FIG. 1 is a top view of one embodiment of the present invention.

Referring to FIG. 1, a device 10 that may be subject to tipping is illustrated in the form of a so-called skid loader. A skid loader is a vehicle prone to tipping because of its small size and its large load carrying capabilities. However, the present invention is in no way limited to skid loaders and may be applied to commercial and recreational vehicles, and to a variety of equipment subjected to forces that may cause tipping.

The device 10 includes a set of four weight supports 12 which may be wheels connected by a body 16. The device 10 also includes a front loader 14 in one embodiment of the invention. Thus, the forces which cause tipping may result in an unbalanced weight condition, created for example by a large force applied through the front loader 14.

However, regardless of the source of the force, tipping may be detected by monitoring the pressure on some or all of the supports 12 that support the device 10. By monitoring the relative amount of weight being carried by each support 12, an indication of tipping likelihood may be obtained.

At the point of tipping, one or more supports 12 may no longer bear any weight at all. As the weight shifts from a support 12, from an evenly balanced distribution, eventually a predetermined point is reached wherein it may be desirable to warn an operator or user of the impending possibility of tipping. The user may then take corrective action to reduce the tipping possibility.

If the user fails to take corrective action, a subsequent warning may be provided when the indication of the force applied to any of the supports falls below still a further level. Ideally, this level is sufficiently low to avoid unnecessarily interfering with the operation of the device 10 while at the same time providing an adequate safety margin to give the user or operator adequate time to avoid tipping.

To provide this information in a prompt fashion, a set of sensors 18 may be provided in association with each of the supports 12 in one embodiment of the present invention. The sensors 18 may be applied in connection with bearings or axles utilized to support the wheels. In one embodiment of the invention, the sensors 18 maybe load cells that provide an indication of the portion of the weight of the overall device 10 borne by each support 12.

Coupled to each of the sensors 18 is a microcontroller 20. The microcontroller 20 may also be coupled to a display 22 arranged proximate to an operator.

The microcontroller 20 may respond not only to a given change in the amount of weight on any given support 12, but may also respond to a rate of change which is sufficiently excessive to raise a tipping concern. Thus, if the rate of change is sufficiently high, the system may determine that an immediate warning may be issued. Otherwise sufficient time to provide a warning may not be available. Thus, in one embodiment of the present invention, the microcontroller 20 may provide tipping indication either when the rate of change of weight on a given support 12 exceeds a given rate of change threshold or when the disparity in forces applied to one support compared to another support indicates that a tipping condition may arise.

Figure 2:
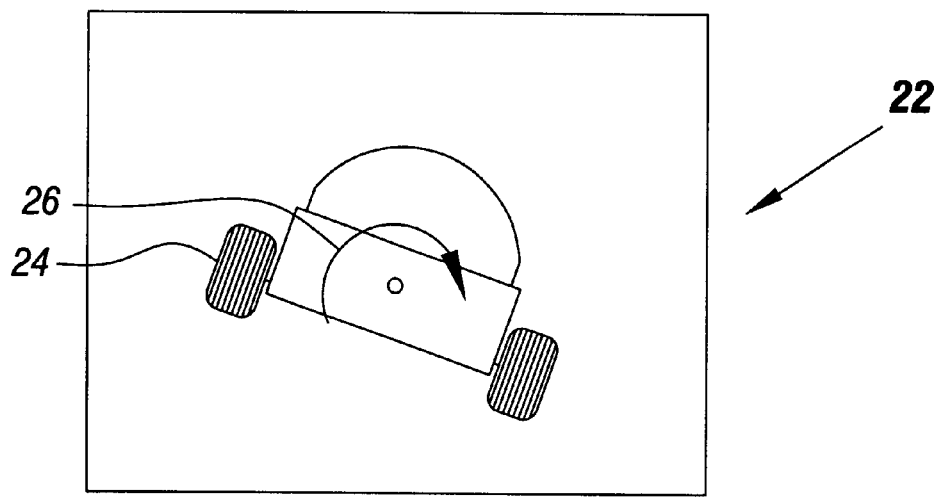
FIG. 2 is a depiction of the computer display, shown in FIG. 1, in accordance with one embodiment of the present invention.

Referring to FIG. 2, the display 22 may provide a simple graphical user interface which facilitates prompt response to the tipping situation. For example, in the case of a skid loader, a depiction of the vehicle may be provided as indicated at 24 showing the detected direction of incipient tipping. A graphical display 26 may also indicate the direction of tipping. Thus, given the display shown in FIG. 2, the user may slow down and turn to the left to attempt to stabilize the device 10. A variety of different graphical user displays may be provided based on the extent and direction of potential tipping which has been detected.

Figure 3:
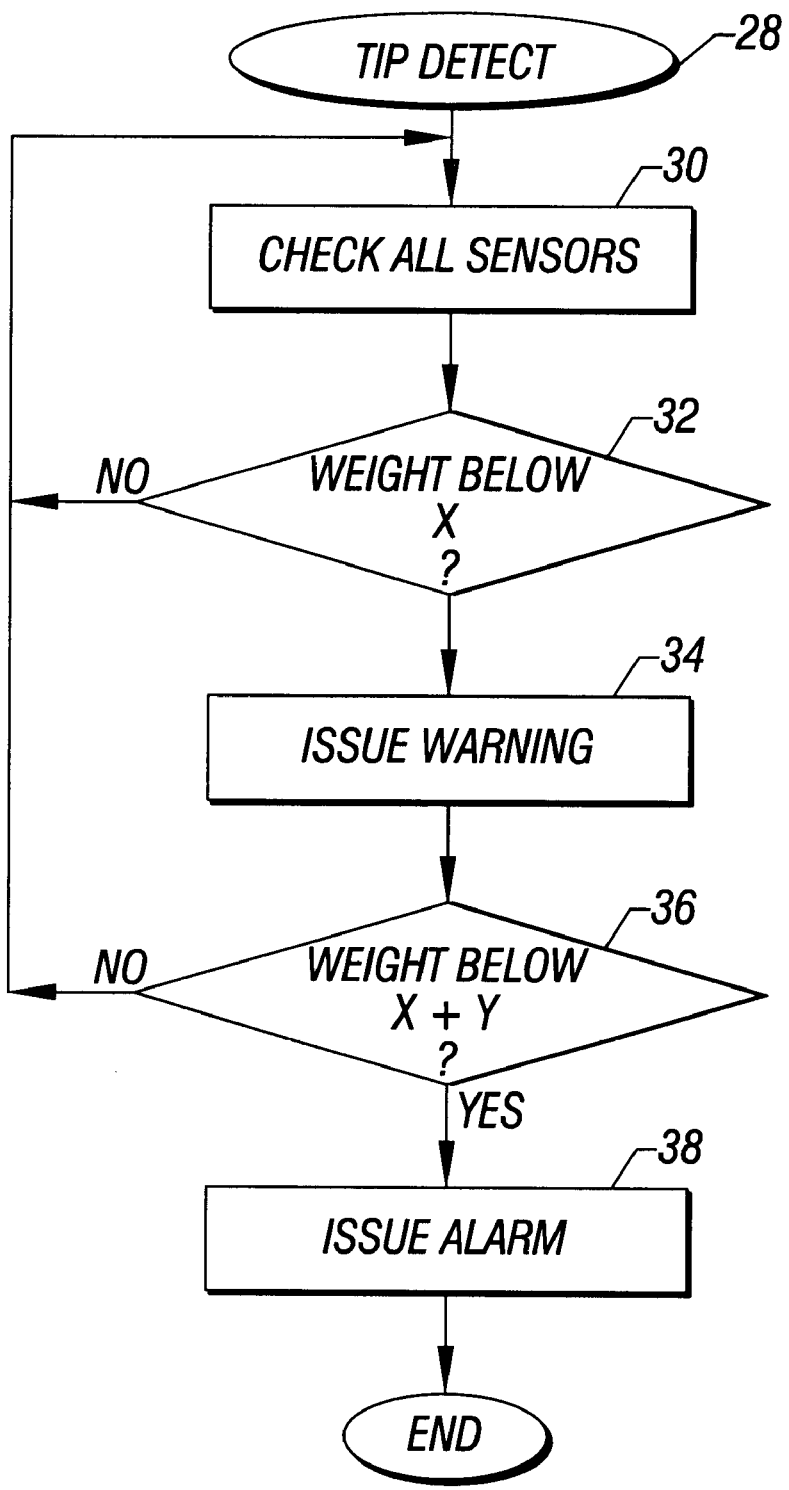
FIG. 3 is a flow chart for software for implementing one embodiment of the present invention.

As shown in FIG. 3, software 28 may be utilized to monitor the sensors 18 and to provide an early warning of potential tipping situations. Initially, all the sensors may be checked, as indicated in block 30, to be sure that each sensor 18 provides a signal. If the weight detected by any of the sensors falls below a given level, indicated as X in diamond 32, a warning may be issued as indicated in block 34.

If the weight falls below an alarm level on any one of the supports 12, such as the level X+Y, an alarm may issued as indicated in block 38. The alarm may provide more urgency than the warning indicated by block 34.

In some embodiments of the present invention, a check may also determine whether the rate of change is sufficiently severe to necessitate a warning. In such case, a variety of different notifications may be provided which may be recognized by the user or operator. For example, different audible indications may be provided for a warning, an alarm, or a rate of change indication.

Figure 4:
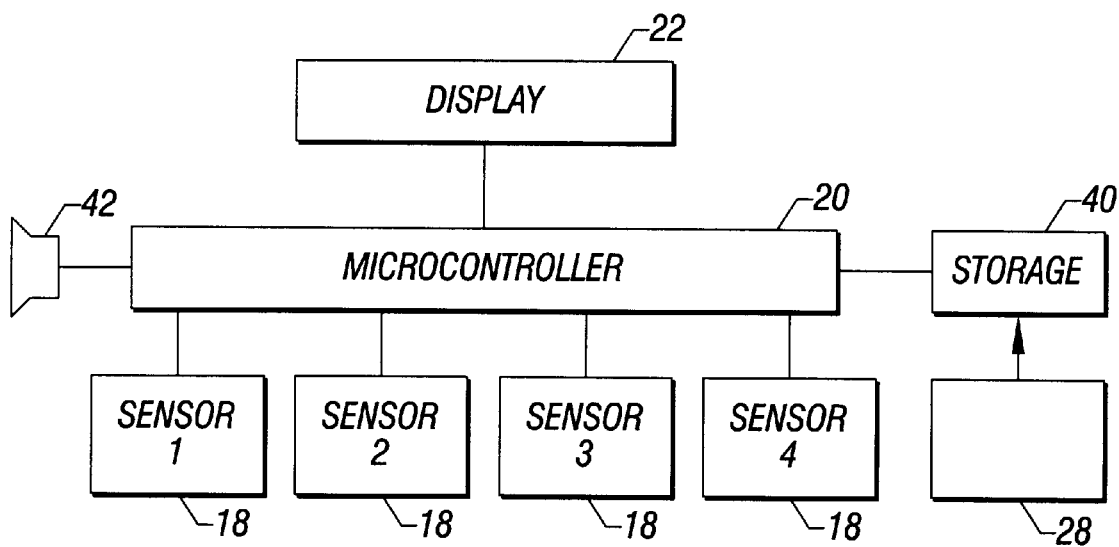
FIG. 4 is a block diagram of hardware for implementing one embodiment of the present invention.

Referring to FIG. 4, one embodiment for implementing the present invention may use a conventional microcontroller 20 coupled to a storage device 40 such as a flash memory. The storage device 40 may store the software 28. Alternatively, the software 28 may be preprogrammed into the microcontroller using conventional microcontroller programming techniques. The microcontroller 20 may be coupled to the display 22 and to a horn or audible warning device 42. Similarly, each of the sensors 18 may be coupled to the microcontroller 20.

The microcontroller 20 may be responsible for analyzing the levels provided by the sensors 18 and in some embodiments of the present invention, the rate of change of levels detected by each of the sensors 18. When a tipping condition is detected, the microcontroller 20 may provide a display on the display 22, as shown in FIG. 2, or audible indications using the audible warning device 42.

In still other embodiments, the microcontroller 20 may automatically take corrective action. For example, if the appropriate action is to slow the device down, the microcontroller may immediately apply braking. Similarly, the microcontroller 20 may institute other corrective actions such as lowering the front loader, causing a vehicle to turn, providing a weight shift, changing the position of a crane or any of a variety of other appropriate corrective actions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of detecting tipping of a device comprising:
obtaining an indication of the force applied to a least two supports for said device;
detecting a rate of change in an indication of the force applied to one of said supports;
determining whether said rate of change exceeds a threshold; and
providing a tipping indication.

2. The method of claim 1 wherein providing an indication includes providing a visual display indicative of the direction of the potential tipping which has been detected.

3. The method of claim 1 wherein providing an indication includes providing an audible indication.

4. The method of claim 1 wherein providing an indication includes providing at least two indications, one indication indicative of a higher tipping likelihood than the other indication.

5. The method of claim 1 wherein obtaining an indication includes obtaining an indication of the weight on two of said supports.

6. The method of claim 5 including obtaining an indication of the weight on each of at least two wheels of a vehicle.

7. The method of claim 1 wherein detecting a change in an indication includes detecting when a predetermined weight level is exceeded.

8. The method of claim 1 including using a processor-based system to analyze signals produced by sensors coupled to said supports.

9. An article comprising a medium for storing instructions that cause a processor-based system to:
obtain an indication of the force applied to at least two supports for a device;
detect a rate of change in an indication of the force applied to one of said supports;
determine whether said rate of change exceeds a threshold; and
provide a tipping indication.

10. The article of claim 9 further storing instructions that cause a processor-based system to provide a visual indication of the direction of the potential tipping which has been detected.

11. The article of claim 9 further storing instructions that cause a processor-based system to provide at least two indications, one indication indicative of a higher tipping likelihood then the other indication.

12. The article of claim 9 further storing instructions that cause a processor-based system to detect when a predetermined weight level is exceeded.

13. A system comprising:
a processor;
storage coupled to said processor;
a pair of weight sensors;
software stored on said storage to:
obtain an indication of the force applied through said sensors;
detect a rate of change in an indication of the force applied to one of said sensors;
determine whether said rate of change indicated exceeds a threshold; and
provide a tipping indication.

14. The system of claim 13 wherein said system is adapted to be mounted on a vehicle having at least two wheels, each sensor arranged to sense the amount of weight on one wheel of the vehicle.

15. The system of claim 14 including a graphical display positioned proximate to the operator of a vehicle to provide an indication of tipping.

16. The system of claim 15 including an audible warning device adapted to provide two different sounds to indicate varying degrees of imminency of tipping.

17. The system of claim 13 wherein said software detects when a force applied by one of said sensors falls below a predetermined threshold.

18. The system of claim 17 wherein said sensors detect the rate of change of weight.

* * * * *